US010963875B2

(12) United States Patent
Alvarez et al.

(10) Patent No.: US 10,963,875 B2
(45) Date of Patent: Mar. 30, 2021

(54) PROCESSING FINANCIAL PRODUCTS

(71) Applicant: Vyze, Inc., Austin, TX (US)

(72) Inventors: Kristin Marie Alvarez, Austin, TX (US); Terence Paul Spielman, Austin, TX (US); Thomas G. Carter, Cedar Park, TX (US); Christopher James Smith, Round Rock, TX (US); Victorino Cardenas, Jr., Austin, TX (US)

(73) Assignee: Vyze, Inc., Austin, TX (US)

( * ) Notice: Subject to any disclaimer, the term of this patent is extended or adjusted under 35 U.S.C. 154(b) by 337 days.

(21) Appl. No.: 14/479,598

(22) Filed: Sep. 8, 2014

(65) Prior Publication Data

US 2016/0071102 A1    Mar. 10, 2016

(51) Int. Cl.
*G06Q 20/00* (2012.01)
*G06Q 40/00* (2012.01)
*G06Q 20/40* (2012.01)
*G06Q 20/34* (2012.01)
*G06Q 20/38* (2012.01)

(52) U.S. Cl.
CPC ......... *G06Q 20/401* (2013.01); *G06Q 20/348* (2013.01); *G06Q 20/385* (2013.01)

(58) Field of Classification Search
None
See application file for complete search history.

(56) References Cited

U.S. PATENT DOCUMENTS

| | | | | |
|---|---|---|---|---|
| 5,930,776 A | * | 7/1999 | Dykstra | G06Q 40/00 705/35 |
| 7,904,332 B1 | * | 3/2011 | Merkley, Jr. | G06Q 30/02 705/14.1 |
| 2002/0077964 A1 | * | 6/2002 | Brody | G06Q 30/02 705/38 |
| 2007/0055630 A1 | * | 3/2007 | Gauthier | G06Q 20/24 705/44 |
| 2008/0091528 A1 | * | 4/2008 | Rampell | G06Q 30/0611 705/14.1 |
| 2008/0255986 A1 | * | 10/2008 | Scarborough | G06Q 40/00 705/38 |
| 2011/0153437 A1 | * | 6/2011 | Archer | G06Q 20/10 705/17 |
| 2014/0180919 A1 | * | 6/2014 | Brown | G06Q 20/1085 705/42 |

(Continued)

*Primary Examiner* — Ariel J Yu
(74) *Attorney, Agent, or Firm* — Kirk A. Cesari; Christian W. Best

(57) ABSTRACT

Financing obtained from a lender may be processed by a retailer in a manner similar to a credit card. For example, transaction data associated with a transaction to acquire one or more items from the retailer may be entered at a point of sale terminal of the retailer. A request may be sent for a temporary shopping pass associated with an account of a consumer at the lender. The temporary shopping pass may be used as a virtual payment instrument to access financing (e.g., a loan, a lease, or a credit) provided by the lender. After receiving the temporary shopping pass, the shopping pass data included in the temporary shopping pass, such as a one-time card number, may be entered into the point of sale terminal. The transaction may be completed by processing the shopping pass data as a credit card type tender using the point of sale terminal.

20 Claims, 12 Drawing Sheets

(56) References Cited

U.S. PATENT DOCUMENTS

| | | | |
|---|---|---|---|
| 2014/0365350 A1* | 12/2014 | Shvarts | G06Q 40/00 |
| | | | 705/35 |
| 2015/0193743 A1* | 7/2015 | Simmons | G06Q 20/023 |
| | | | 705/39 |
| 2015/0220999 A1* | 8/2015 | Thornton | H04M 15/8011 |
| | | | 705/14.66 |

* cited by examiner

1100

```
┌─────────────────────────────────────────────────────────────┐
│ CONSUMER PRESENTS ORIGINAL PURCHASE RECEIPT AND ITEM(S) TO BE│
│              RETURNED TO AGENT OF RETAILER                   │
│                           1102                               │
└─────────────────────────────────────────────────────────────┘
                              ↓
┌─────────────────────────────────────────────────────────────┐
│ RECEIPT AND IDENTIFIER(S) OF ITEM(S) ENTERED (E.G., SCANNED) │
│             AT POINT OF SALE (POS) TERMINAL                  │
│                           1104                               │
└─────────────────────────────────────────────────────────────┘
                              ↓
┌─────────────────────────────────────────────────────────────┐
│ ONE-TIME CARD NUMBER (OCN) AND AN AMOUNT TO BE RETURNED      │
│               DETERMINED AT POS TERMINAL                     │
│                           1106                               │
└─────────────────────────────────────────────────────────────┘
                              ↓
┌─────────────────────────────────────────────────────────────┐
│   SEND RETURN REQUEST FROM POS TERMINAL TO A MERCHANT        │
│                         ACQUIRER                             │
│                           1108                               │
└─────────────────────────────────────────────────────────────┘
                              ↓
┌─────────────────────────────────────────────────────────────┐
│   MERCHANT ACQUIRER PASSES THE RETURN REQUEST TO A BANK      │
│                         PROCESSOR                            │
│                           1110                               │
└─────────────────────────────────────────────────────────────┘
                              ↓
┌─────────────────────────────────────────────────────────────┐
│ IF THE BANK PROCESSOR DETERMINES THAT THE OCN IS VALID, THE  │
│     BANK PROCESSOR AUTHORIZES REVERSAL OF A CHARGE           │
│                           1112                               │
└─────────────────────────────────────────────────────────────┘
                              ↓
┌─────────────────────────────────────────────────────────────┐
│ THE BANK PROCESSOR SENDS A REVERSAL MESSAGE TO THE MERCHANT  │
│                         ACQUIRER                             │
│                           1114                               │
└─────────────────────────────────────────────────────────────┘
                              ↓
┌─────────────────────────────────────────────────────────────┐
│ THE MERCHANT ACQUIRER FORWARDS THE REVERSAL MESSAGE TO THE   │
│                      POS TERMINAL                            │
│                           1116                               │
└─────────────────────────────────────────────────────────────┘
                              ↓
┌─────────────────────────────────────────────────────────────┐
│ THE POS TERMINAL PROCESSES THE REVERSAL. CUSTOMER CREDIT     │
│       ISSUED THROUGH CLEARING AND SETTLEMENT PROCESS         │
│                           1118                               │
└─────────────────────────────────────────────────────────────┘
                              ↓
┌─────────────────────────────────────────────────────────────┐
│     THE POS TERMINAL PROCESSES AN ADDITIONAL TRANSACTION     │
│                           1120                               │
└─────────────────────────────────────────────────────────────┘
```

FIG. 11

PROCESSING FINANCIAL PRODUCTS

BACKGROUND

A retailer may desire to offer consumers access to financing from more than one provider of financing because having more than one lender may enable the retailer to complete more transactions and thereby increase sales. However, integrating different types of lenders to enable transactions to be quickly and smoothly processed may prove cumbersome. For example, each lender may each have a different way in which they provide financing, resulting in the retailer having to follow a lender-specific procedure to process each transaction.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations may include entering, at a point of sale terminal of a retailer, transaction data associated with a transaction to acquire one or more items from the retailer. A consumer associated with the consumer transaction may have an account at a lender that is associated with the retailer. A temporary shopping pass associated with the account of the consumer at the lender may be requested. After receiving the temporary shopping pass, the shopping pass data included in the temporary shopping pass, such as a one-time card number, may be entered into the point of sale terminal. The transaction may be completed by processing the shopping pass data as a credit card type tender using the point of sale terminal.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 11 is a flow diagram of an example process that includes processing a return for a purchase made using a temporary shopping pass according to some implementations.

DETAILED DESCRIPTION

Figure 1:
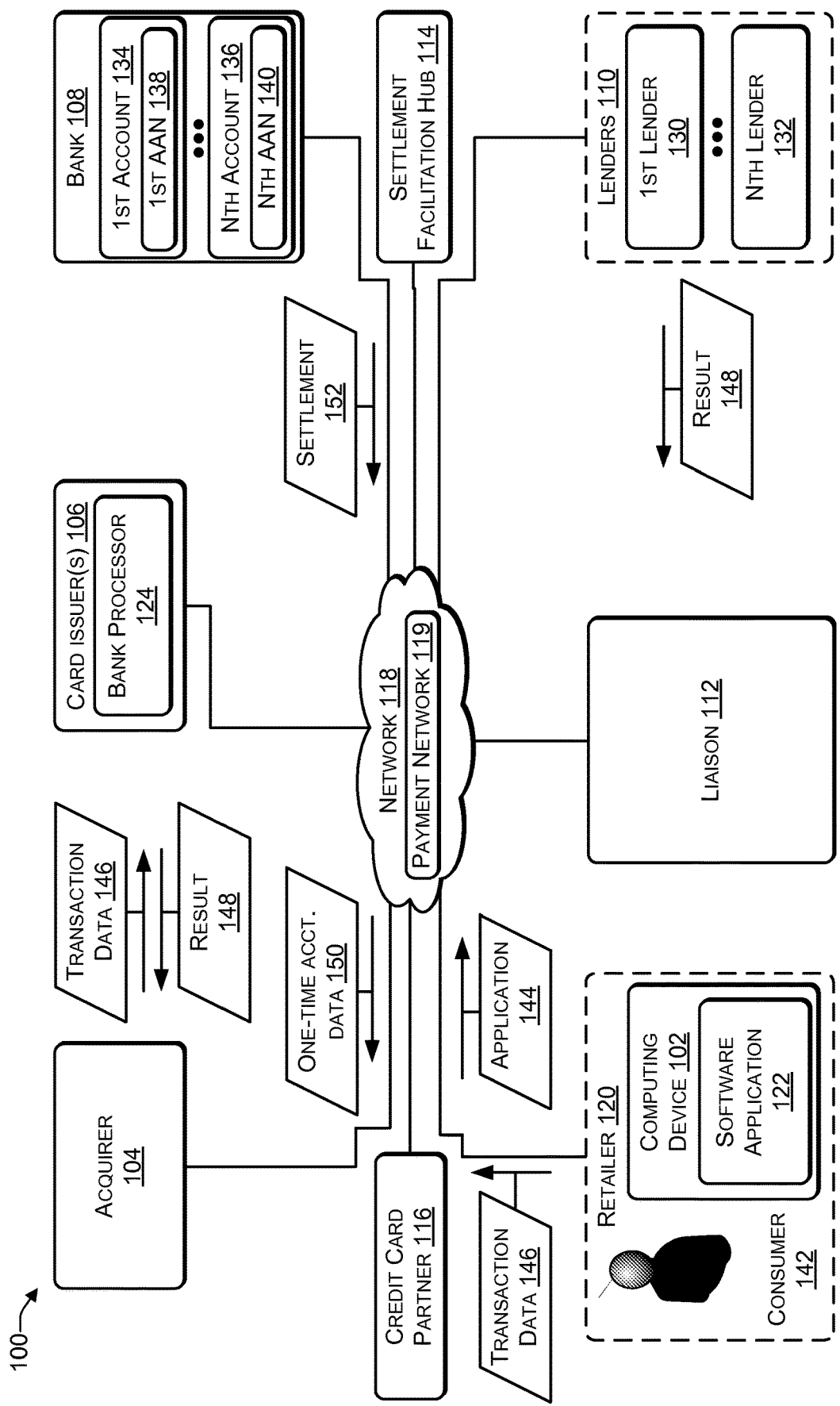
FIG. 1 is an illustrative architecture to process financing according to some implementations.

The techniques and systems described herein may enable a retailer to offer financing from multiple lenders and process the financing in a manner similar to processing a credit card transaction. In this way, the multiple lenders may "ride the rails" of a credit card network. The retailer can thus provide financing from multiple lenders without significantly changing the way the financing is processed.

When a consumer completes an application for financing at a retailer, the application may be sent to one or more lenders. The one or more lenders may determine, based on various criteria (e.g., credit score, income, military service etc.), whether to provide an offer of financing to the consumer. If more than one lender provides an offer, one of the offers may be selected based on one or more criteria and provided to the consumer. For example, one of the offers may be selected based on one or more criteria provided by the retailer, such as a highest credit limit or lowest interest rate. The selected offer may be presented to the consumer at the retailer. If the consumer accepts the selected offer, an account may be opened for the consumer. The consumer may be provided with a temporary (e.g., one-time use) shopping pass that includes a one-time card number (OCN). The temporary shopping pass may be a virtual payment instrument that is associated with and provides access to financing (e.g., loan, lease, revolving line of credit, or the like) provided by the lender. The one-time card number may have characteristics similar to a credit card number because the one-time card number may have the same length (e.g., 16 digits) as a credit card number, an associated security code (e.g., three or four number code) similar to a credit card, an associated expiry date similar to a credit card, another characteristic, or any combination thereof. Because the one-time card number has characteristics that are similar to a credit card, the temporary shopping pass may be used by a consumer and processed by the retailer in a manner similar to a credit card. The primary difference between the one-time card number and a credit card number may be that the one-time card number may only be used once. The purchase data may be sent to the lender for authorization. If the lender determines that the account data is valid and that the transaction does not exceed the consumer's available credit limit, the lender may approve the creation of the shopping pass. Otherwise, e.g., the account data is invalid or the transaction exceeds the consumer's available credit limit the lender may decline to approve the request.

To initiate a transaction to acquire one or more items, the consumer may present the shopping pass, along with an indication of the items to be acquired, to an agent (e.g., a salesclerk) of the retailer. The retailer's agent may process the transaction in a manner similar to a credit card transaction, e.g., by entering, at a point-of-sale terminal (POS), the transaction amount and account data, such as one or more of the card number (e.g., the one-time card number) of the shopping pass, the expiry date of the shopping pass, or the security code of the shopping pass. The transaction amount and the account data may be sent across a credit card processing network and identified as a one-time card number. In response to the POS receiving the transaction approval message from the credit card processing network, the retailer's agent may inform the consumer that the transaction was declined.

Thus, the systems and techniques described herein may enable a retailer to offer financing through multiple lenders while processing the financing in a manner similar to processing a credit card transaction using the retailer's existing POS and credit card processing network. Thus, the retailer can, without integrating any additional hardware and/or software with the POS, process financing offered by multiple lenders.

Illustrative Architectures

FIG. 1 is an illustrative architecture 100 to process financing in a manner similar to a credit card transaction according to some implementations. The architecture 100 is used to provide an overview of processing financial products (e.g., credit offerings) in a manner similar to a credit card transaction. Further details associated with processing financial products (e.g., credit offerings) in a manner similar to a credit card transaction are discussed in subsequent figures. The architecture 100 includes a representative computing device 102, an acquirer 104, one or more card issuers 106, a bank 108, one or more lenders 110, a lender liaison 112, a settlement facilitation hub 114, and a credit card partner 116 connected to a network 118. The network 118 may include one or more networks, such as a wireless local area network (e.g., WiFi®, Bluetooth™, or other type of near-field communication (NFC) network), a wireless wide area network (e.g., a code division multiple access (CDMA), a global system for mobile (GSM) network, or a long term evolution (LTE) network), a wired network (e.g., Ethernet, data over cable service interface specification (DOCSIS), Fiber Optic System (FiOS), Digital Subscriber Line (DSL) and the like), another type of network, or any combination thereof. The network 118 may include a private network, a public network, or both. As illustrated in FIG. 1, a portion of the messages may travel across a payment network 119. The payment network 119 may be a private network, such as an inter-bank network (e.g., Interac, Novus, or the like) or a credit card processing network (e.g., Mastercard® network, Visa® network, etc.).

Figure 12:
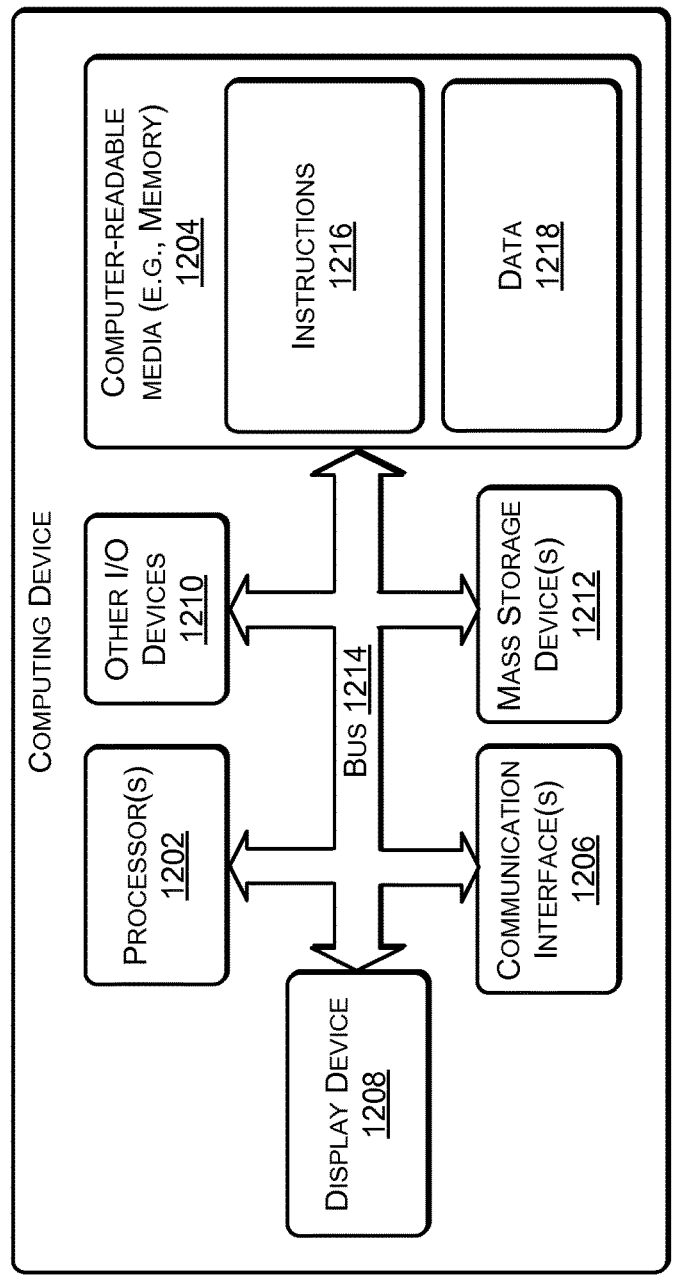
FIG. 12 illustrates an example configuration of a computing device and environment that can be used to implement the modules and functions described herein.

The computing device 102, the acquirer 104, the one or more card issuers 106, the bank 108, the one or more lenders 110, the lender liaison 112, the settlement facilitation hub 114, and the credit card partner 116 may each comprise a computer-based device that includes one or more processors and one or more computer-readable media to store instructions that are executable by the one or more processors to perform various functions, as illustrated in more detail in FIG. 12. The computing device 102 may be a point of sale (POS) terminal, a kiosk, or a consumer device, such as a wireless phone, a tablet computer, a personal computer, a media playback device, or other consumer device.

The representative computing device 102 may be located at a location of a retailer 120. While a single computing device 102 is illustrated in FIG. 1, the retailer 120 may have more than one POS terminal at each location and more than one consumer device may be located at each location of the retailer 120. The retailer 120 may have more than one location. For example, the retailer 120 may have multiple locations that are geographically dispersed and each of the multiple locations may have one or more POS terminal devices. The computing device 102 may be a computing device (e.g., as described in more detail in FIG. 12) with one or more processors, one or more input devices (e.g., keyboard, mouse, bar code scanner, touch-sensitive pad, etc.) and one or more computer-readable media. The computer-readable media may be used to store an operating system, device drivers, and one or more software applications, such as a representative software application 122.

The acquirer 104 (also referred to as a merchant acquirer or acquiring bank) may be a financial institution that processes credit card payments or debit card payments on behalf of a merchant, such as the retailer 120. The acquirer 104 may acquire credit card payments from card-issuing banks, such as the card issuers 106, within an association, such as Visa, MasterCard, Discover, American Express, Diners Club, or the like.

A bank processor 124 may be connected to the network 118. The bank processor 124 is an agent of (e.g., acts on behalf of) an issuing bank (e.g., one of the card issuers 106) to process transactions, such as credit card transactions. Thus, the acquirer 104 may act on behalf of the retailer 120 to process transactions while the bank processor 124 may act on behalf of an issuing bank to process the transactions.

The card issuers 106 may include one or more payment processors who process payments, such as a bank processor 124. The bank processor 124 may be appointed by a bank, such as the bank 108, to handle credit card transactions. The bank processor 124 may check transaction details by forwarding the transaction details to a respective card's issuing bank (e.g., the bank 108) for verification. After the bank processor 124 has received confirmation that the credit card details have been verified, the transaction confirmation may be provided back to the retailer 120, and the transaction may be completed. If verification is denied by the issuing bank, the payment processor may provide the information to the merchant, and the merchant may decline the transaction.

The lenders 110 may include a first lender 130 though to an Nth lender 132 (where N>1). The lenders 110 may include companies that provide consumer financing, including lease-to-purchase or other financing options.

The bank 108 may include multiple lender accounts, such as a first account 134 to an Nth account 136. For example, the first account 134 may correspond to the first lender 130 and the nth account 136 may correspond to the nth lender 132. In some cases, the accounts 134 to 136 may be part of a line of credit provided to the liaison 112. The line of credit may be divided into the accounts 134 to 136 for association with the lenders 130 to 132. Each of the accounts 134 to 136 may be associated with a actual account number (AAN). For example, the first account 134 may be associated with a first actual account number 138 and the Nth account 136 may be associated with an Nth actual account number 140. One-time card numbers provided for use with shopping passes may be derived from the actual account numbers.

The liaison 112 may be an intermediary that facilitates access to the lenders 110 for the retailer 120. For example, the liaison 112 may be a company such as NewComLink that provides retailers with access to multiple lenders.

The settlement facilitation hub (SFH) 114 may facilitate the settlement of transactions between the lenders 110, the retailer 120, the liaison 112, and the bank 108. The SFH 114 may receive the transaction data that includes transactions (e.g., purchases), retrieve each transaction from the transaction data, and store each transaction (e.g., in one or more databases). The SFH 114 may identify a lender associated with each transaction based on the transaction data. The SFH 114 may determine a clearinghouse associated with the lender. For example, many lenders may use a specific clearinghouse. Examples of a clearinghouse include Discover Card's Pulse, First Data's STAR, and New York Currency Exchange (NYCE). The SFH 114 may create settlement transaction data corresponding to each transaction of the transaction data. The settlement transaction data corresponding to a particular transaction may be formatted for the clearinghouse and the lender associated with the particular transaction. The SFH 114 may provide the settlement transaction data to the clearinghouse of the lender that is associated with the transaction. When multiple retailers are each using multiple lenders, the SFH 114 may provide settlement transaction data to multiple clearinghouses. The settlement transaction data sent to a particular clearinghouse may include transactions associated with multiple retailers and may be intended for lenders that use the particular clearinghouse.

In response to receiving the settlement transaction data, the clearinghouse may initiate a transfer of funds from one or more lender accounts to one or more retailer accounts. The clearinghouse may provide transaction results identifying which settlement transactions were successfully processed, which settlement transactions were unsuccessfully processed (e.g., an error occurred), which type of errors occurred (if errors occurred), etc. The transaction results may include results for transactions of lenders associated with the clearinghouse and may include results of transactions from multiple retailers. In response to receiving the transaction results, the SFH 114 may update the status of each stored transaction. For example, if the transaction results indicate that a particular transaction was successfully completed, the SFH 114 may update the status of the stored transaction to indicate that the particular transaction was completed. The SFH 114 may compile a report for each retailer, providing details as to which transactions were successfully performed, the amount of funds transferred in each transaction, which transactions were unsuccessful and why, etc.

For example, the consumer 142 may accept an offer of financing (e.g., $2000 credit limit) from the Nth lender 132 (e.g., one of the lenders 110) and purchase an item from the retailer 120 for $1000. The retailer 120 may provide transaction data to the SFH 114 indicating that (1) a purchase for $1000 occurred and (2) the Nth lender 132 financed the purchase. The SFH 114 may store the transaction, identify a clearinghouse as the clearinghouse associated with Nth lender 132, and create settlement transaction data, based on the transaction data, indicating that (1) a purchase for $1000 occurred and (2) information associated with settling the purchase. The SFH 114 may create the settlement transaction data in a format that the clearinghouse is capable of receiving and acting upon. The SFH 114 may provide the settlement transaction data to the clearinghouse.

In response to receiving the settlement transaction data, the clearinghouse may initiate the transfer of funds based on the information in the settlement transaction data. In this example, the clearinghouse may initiate a transfer of funds (e.g., $1000) from an account of Nth lender 132 to an account of the retailer 120. The clearinghouse may provide transaction results to the SFH 114 that indicate whether the settlement transaction, e.g., transferring $1000 from an account of Nth lender 132 to an account of the retailer 120, was successfully completed. In response to receiving the transaction results, the SFH 114 may update the status of the stored transaction. For example, the SFH 114 may update the status of the stored transaction to indicate that the funds were successfully transferred. As another example, the SFH 114 may update the status of the stored transaction to indicate that the transfer of funds was unsuccessful and identify the problem that was encountered. The SFH may identify all updated transactions and create a report for each retailer identifying the status of the updated transactions. In this example, the SFH 114 may provide a report to the retailer 120 indicating that the transaction was successfully processed, e.g., $1000 in funds was successfully transferred from an account of Nth lender 132 to an account of the retailer 120.

While $1000 is used as an example, a typical settlement may take into account fees, discounts etc., such that the actual amount transferred as part of the settlement may be less than $1000. For example, the lender involved in the transaction may be paid a fee (e.g., a flat fee or a percentage of the transaction) during the settlement process, the clearinghouse involved in the transaction may be paid a fee during the settlement process (e.g., a flat fee or a percentage of the transaction), or both the lender and the clearinghouse may be paid a fee. To illustrate, if the lender is paid a 10% fee and the clearinghouse is paid a 5% fee, then for a $1000 transaction, the lender may be paid $100 and the clearinghouse may be paid $50. In this example, $850 (e.g., $1000-$100-$50) may be transferred from the lender's account to the retailer's account to settle the transaction and the settlement report may indicate that $850 was transferred. The settlement report may provide details as to the fees paid to the lender and/or to the clearinghouse. For example, the settlement report may indicate that the total value of the purchase was $1000 and detail that $100 went to the lender, $50 went to the clearinghouse, and $850 was transferred to settle the transaction. In some cases, the SFH 114 may be paid a fee to compensate for facilitating the transaction and the settlement report may provide details as to the fees paid to the lender, the clearinghouse, and the SFH 114.

Thus, the SFH 114 may enable multiple retailers to each offer consumers access to multiple lenders. Instead of formatting and providing transaction data items for each specific lender used by each retailer, each retailer merely sends the transaction data associated with the multiple lenders to the SFH 114 for processing. Each retailer may format the transaction data according to an SFH-format instead of formatting the transaction data for multiple clearinghouses or multiple lenders who each have their own specific format. The SFH 114 identifies the transactions associated with a particular clearinghouse and formats settlement transactions according to the format used by each clearinghouse. After the SFH 114 sends the settlement transactions to each clearinghouse used by the various lenders, the clearinghouses initiate the transfer of funds and provide transaction results indicating whether the funds associated with each transaction were successfully transferred from a lender account to a retailer account. The clearinghouses provide transaction results to the SFH 114, which updates the status of the stored transactions based on the transaction results. The SFH 114 produces a report for each retailer based on the updated transactions and sends the report to each retailer. Each report may be formatted specifically for each retailer. Thus, by using the SFH 114, the cost and effort (e.g., formatting data, etc.) to access the multiple lenders 110 for each retailer is significantly reduced because (1) each retailer sends transaction data in an SFH-readable format to the SFH 114 (rather than having to format the transaction data for each clearinghouse and/or lender) and (2) each retailer receives a settlement report in a format specific to the retailer, e.g., the retailer does not modify the settlement report to a retailer-readable format because the SFH 114 provides each retailer with the settlement report in the retailer-readable format.

The credit card partner 116 may provide the retailer 120 with access to a credit card processing network, e.g., a private network used to process credit card transactions. The retailer 120 may use the credit card processing network of the credit card partner 116 to process financial products, such as credit offerings, provided by one or more of the lenders 110.

A consumer 142 may apply for credit by filling out an application 144 and sending the application 144 to one or more of the lenders 110. The lenders 110 may include non-banking financial institutions that offer various types of credit instruments. If one of the lenders 110 approves the application 144, a credit account associated with the consumer 142 may be created. The credit account may have an associated credit limit that identifies a maximum amount that the consumer 142 may borrow at any given time.

When the consumer 142 desires to initiate a transaction to acquire (e.g., to purchase, lease, or lease purchase) one or more items (e.g., goods, services, or both goods and services) from the retailer 120, the retailer 120 may create transaction data 146 associated with the transaction using the computing device 102. The transaction data 146 may identify one or more of good(s), service(s), other items, or any combination thereof that the consumer 142 is acquiring. The transaction data 146 may also identify other information associated with the transaction, such as an amount of tax, a shipping charge, an amount of a discount, etc.

The transaction data 146 may be sent to the Nth lender 132 (from the lenders 110) where the consumer 142 previously created an associated credit account. The transaction data 146 may include a total amount of the transaction as well as information associated with the consumer 142 to enable the Nth lender 132 to identify the associated credit account. The Nth lender 132 may authorize the transaction data 146 and determine, based on the transaction data 146, whether the total of the transaction would cause a credit limit associated with the credit account of the consumer 142 to be exceeded. If the total of the transaction would cause the credit limit to be exceeded, the Nth lender 132 may decline to authorize the transaction and send a result 148 to the computing device 102 indicating that the transaction was declined. If the cost of the transaction would not cause the credit limit associated to be exceeded, the Nth lender 132 may approve the transaction. In response to the Nth lender 132 approving the transaction, one-time account data 150 may be created and sent to the computing device 102. The one-time account data 150 may be derived from one of the actual account numbers 138 to 140. The one-time account data 150 may resemble a credit card in that the one-time account data 150 may include a sixteen digit account identifier, a three or four digital security code, an expiration date, other features to control the use of the one-time card number, or any combination thereof.

The one-time account data 150 may be processed by the computing device 102 in a manner similar to a credit card. For example, an agent of the retailer 120 may enter the account identifier, the security code, and the expiration date of the one-time account data 150, similar to how the agent would enter the account identifier, the security code, and expiration date of a credit card. The computing device 102 may process the one-time account data 150 in a manner similar to a credit card number, e.g., by sending the transaction data 146 and the one-time account data 150 to the acquirer 104 via a network of the credit card partner 116.

The acquirer 104 may authorize the one-time account data 150 and send the transaction data 146 and the one-time account data 150 to the bank processor 124. If the bank processor 124 determines that the account associated with the one-time account data 150 is valid and that the credit limit would not be exceeded based on the transaction data 148, then the bank processor 124 may approve the transaction and send approval to the computing device 102. Upon receiving approval for the transaction, the computing device 102 may complete the transaction. The computing device 102 may provide the consumer 142 with a receipt associated with the transaction.

Thus, the consumer 142 may send an application for credit to one or more of the lenders 110. If the application is approved by one of the lenders, an account associated with the consumer 142 may be created.

At a later point in time (e.g., after the creation of the account), the consumer 142 may initiate a transaction to acquire an item from a retailer. The retailer may send transaction data associated with the transaction along with information associated with the consumer's account to the lender. If the lender approves the transaction, the retailer may receive one-time account data, in the form of a temporary shopping pass, which the consumer 142 may use to complete the transaction. The one-time account data may include one or more of a one-time card number, an expiry date, or a security code.

The retailer may treat the one-time account data in a manner similar to a credit card, e.g., by entering the one-time account data in a manner similar to entering credit card data. The one-time account data may be processed in a manner similar to a credit card, e.g., the one-time account data may be sent over a private credit card network of the credit card partner 116 of the retailer 120. In this way, the retailer can process financing from lenders using the retailer's existing credit processing mechanism instead of electronically linking to one or more lenders. In addition, the retailer can provide financing from multiple lenders, including lenders that do not offer credit cards.

Figure 2:
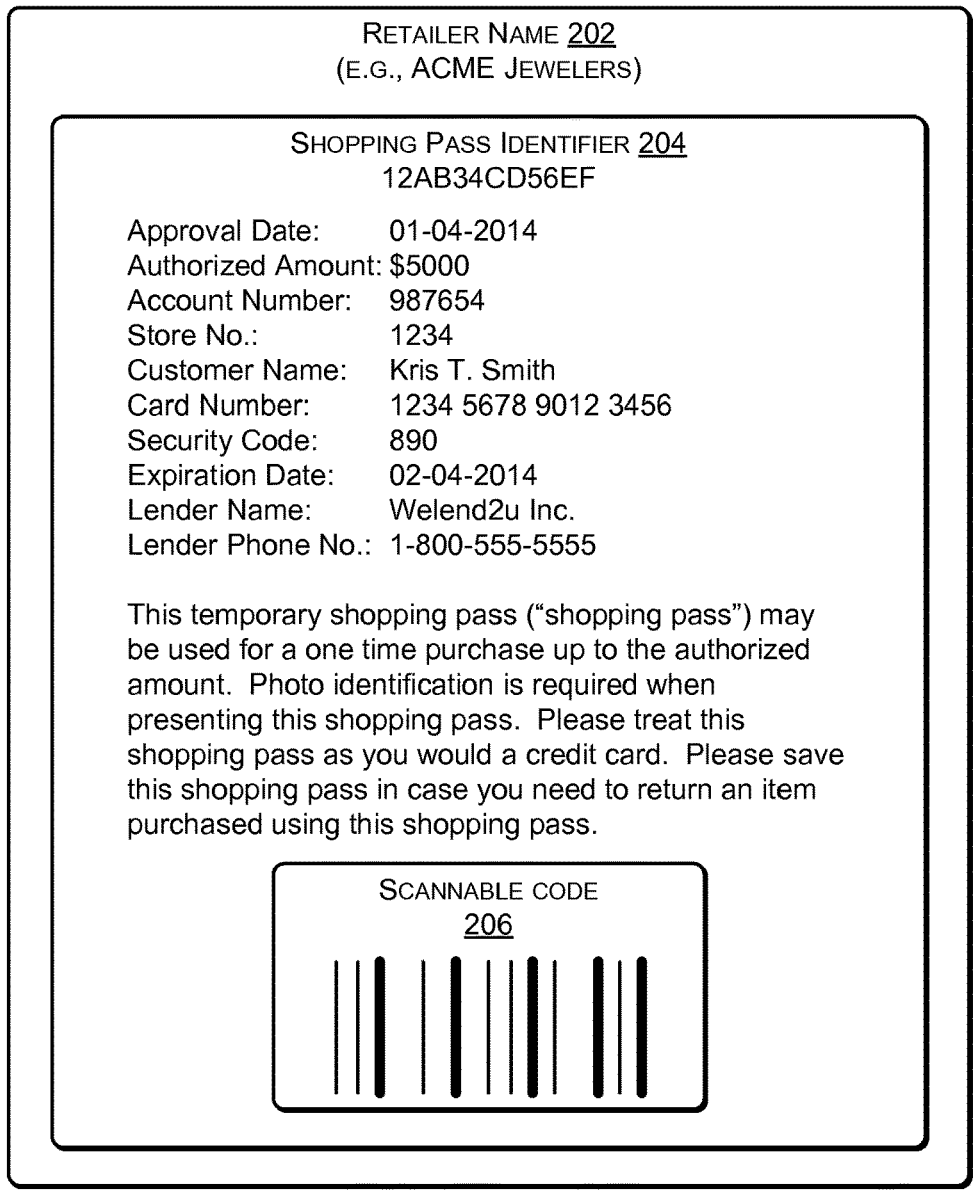
FIG. 2 is an example of a shopping pass according to some implementations.

FIG. 2 is an example of a shopping pass 200 according to some implementations. The temporary shopping pass 200 may be a virtual payment instrument that is associated with a financial instrument provided by the lender. The financial instrument may be a loan, a lease, a revolving line of credit, a stored value, a direct currency conversion, a direct electronic debit, another type of financial instrument, or any combination thereof. A consumer may use the temporary shopping pass 200 to securely access the financing provided by the lender. As illustrated in FIG. 2, the shopping pass 200 may include various information associated with a lender account associated with a consumer. For example, a retailer name 202 may indicate where (e.g., at which retailer) the shopping pass 200 was printed. In some cases, the shopping pass 200 may only be valid for the retailer names in the retailer name 202. In other cases, the shopping pass 200 may be valid at any retailer associated with the lender where the consumer has created an account.

The shopping pass 200 may include a unique shopping pass identifier 204 (e.g., a hexadecimal number or a decimal number) and a scannable code 206. The scannable code 206 may be a universal product code (UPC), a quick reference (QR) code, a bar code, or another type of code that can be scanned by the computing device 102 of the retailer 120. Scanning the scannable code 206 may provide the computing device 102 with various information associated with the shopping pass 200. For example, the information associated with the shopping pass 200 may include one or more of an approval date identifying when the shopping pass was approved by the lender, an authorized amount identifying a maximum amount available for a particular transaction or for the account, an account number, a store number (e.g., where the shopping pass 200 was printed or where the shopping pass 200 is approved for use), a consumer name, a one-time card number to be used to process the shopping pass in a manner similar to a credit card number, an expiration date after which the temporary shopping pass 200 is no longer valid, a security code (note that while the security code is illustrated as a three digit code in FIG. 2, the security code may be any number of digits, e.g., greater than or fewer than three digits), a lender name identifying the lender (e.g., one of the lenders 110), a lender phone number, or terms and conditions associated with the shopping pass 200. The terms and conditions may indicate various conditions, such as one or more of an indication that the shopping pass 200 is a single use financial instrument, an amount of a transaction for which the shopping pass 200 is used may not exceed the authorized amount, the shopping pass 200 should be used to return any items purchased using the shopping pass 200, or other terms or conditions associated with the shopping pass 200.

Thus, when a consumer desires to initiate a transaction at a retailer, a lender may provide the shopping pass 200 to enable the consumer to complete the transaction. In some cases, the shopping pass 200 may be printed at the retailer's location using the retailer's point of sale terminal, a kiosk, or other computing device. In other cases, the shopping pass 200 may be sent to and displayed on a computing device associated with the consumer, such as a mobile phone or tablet computing device. In such cases, the consumer may display the shopping pass and the retailer may scan the scannable code 206. The shopping pass 200 may be processed by the retailer in a manner similar to a credit card, e.g., the card number, expiration date, and security code of the shopping pass 200 may be processed by the retailer in a manner similar to the corresponding fields (e.g., card number, expiration date, and security code) of a credit card. For example, an agent of the retailer may scan the scannable code 206 or enter at least a portion of the information from the shopping pass 200 into the point of sale terminal of the retailer. The point of sale terminal may process the information associated with the shopping pass 200 in a manner similar to a credit card and send the information along with transaction-related data to a merchant acquirer. The merchant acquirer may send the information and the transaction-related data to a network processor associated with a credit card company for processing. The result (e.g., approval or decline) of sending the information and the transaction-related data may be sent back to the point of sale terminal. If the result indicates that the transaction was approved, the transaction may be completed.

Figure 3:
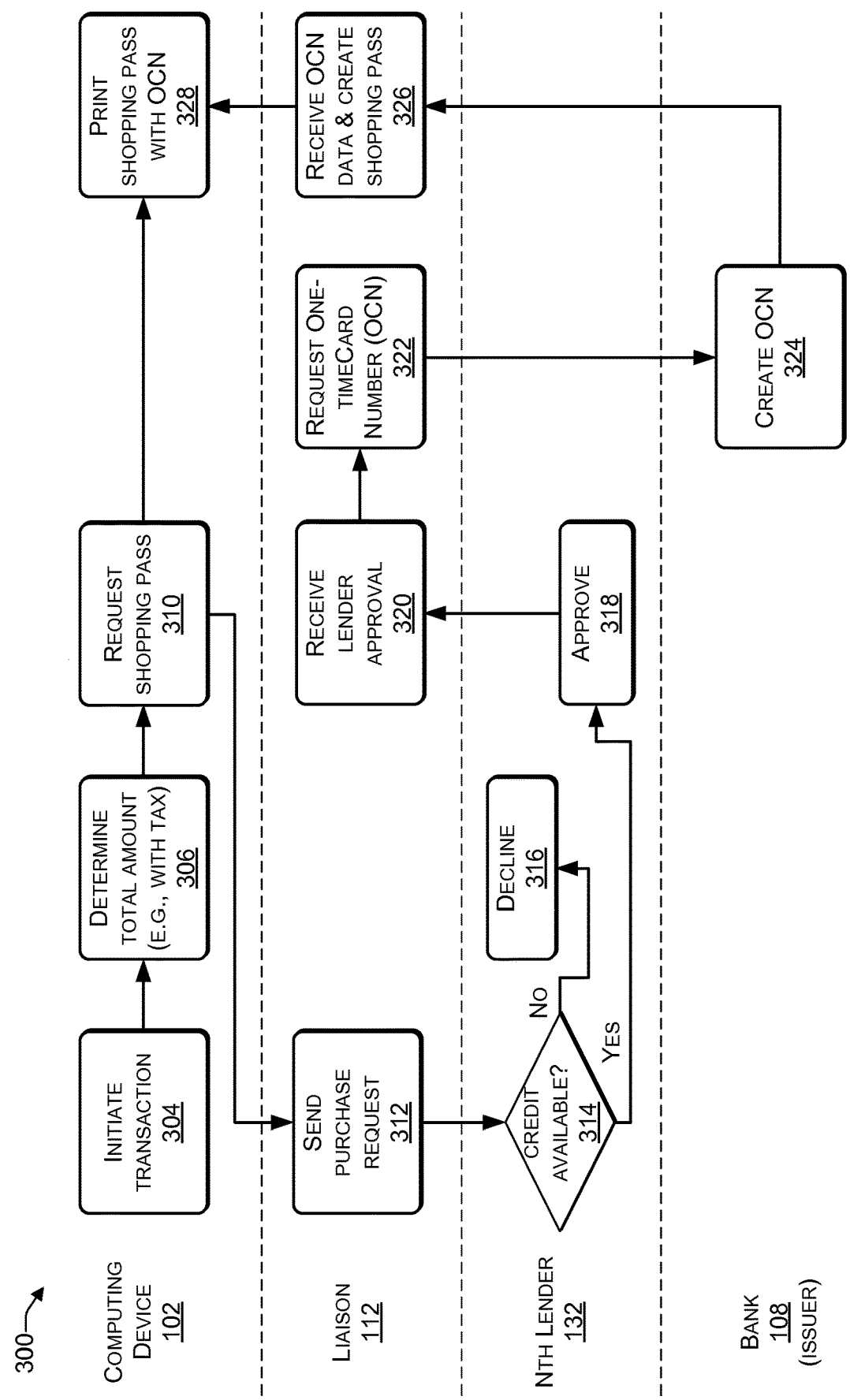
FIG. 3 is a flow diagram to create a shopping pass according to some implementations.

FIG. 3 is a flow diagram 300 to create a shopping pass according to some implementations. The flow diagram 300 illustrates the interaction between the various entities of FIG. 1 when creating a shopping pass, such as the shopping pass 200 of FIG. 2.

At 304, an agent of the retailer may, in response to a consumer request, initiate a transaction at the computing device 102 of FIG. 1. The consumer may desire to acquire one or more items from the retailer as part of the transaction. The agent of the retailer may enter (e.g., by scanning a code of each item) an identifier associated with each of the one or more items to be acquired as part of the transaction.

At 306, the computing device 102 may determine a total associated with the transaction by adding the amounts corresponding to each of the one or more items, subtracting any discounts associated with the transaction, adding any taxes (e.g., state or federal taxes) associated with the transaction, etc.

At 310, the computing device 102 may send a request to provide a shopping pass to enable the transaction to be completed. The computing device 102 may send the shopping pass request to the liaison 112 or to the Nth lender 132.

At 312, the liaison 112 may send a purchase request to the Nth lender 132.

At 314, the Nth lender 132 may compare the total amount of the transaction with an amount of available credit associated with the consumer's account to determine whether to approve or decline the shopping pass request. For example, the consumer's account may have a credit limit of X, the consumer may have an amount Y owing on the account based on a previous transaction, and the current transaction may have a total amount of Z. The Nth lender 132 may determine whether the consumer has available credit by determining whether $Y+Z<=X$. If the sum of Y and Z is greater than X, then the Nth lender 132 may decline the purchase request, at 316. If the Nth lender 132 declines the shopping pass request, a message may be sent to the computing device 102 indicating that the shopping pass request was denied.

If the sum of Y and Z is less than or equal to X, then the Nth lender 132 may approve (e.g., open to buy) the purchase request, at 318. The Nth lender 132 may send a message to the liaison 112 indicating that the purchase request was approved.

At 320, the liaison 112 may receive the lender approval. The lender approval may also indicate an amount of financing (e.g., credit limit) that the lender has approved.

At 322, in response to receiving the lender approval, the liaison 112 may send a request to the bank 108 requesting that a one-time card number (OCN) be created.

At 324, the bank 108 (or the bank processor 124) may create the OCN in response to the OCN creation request from the liaison 112 and send the OCN to the liaison 112.

At 326, the liaison 112 may receive the OCN, create a shopping pass (e.g., similar to the shopping pass 200 of FIG. 2), and send the shopping pass to the computing device 102 for the consumer to redeem. The agent of the retailer may enter the information included in the shopping pass into the computing device 102 to redeem the shopping pass. The computing device 102 may process the shopping pass information to complete the transaction initiated at 304 in a manner similar to the way the computing device 102 processes a transaction in which a credit card is used as the method of payment.

Thus, when a consumer initiates a transaction at a retailer, the consumer may indicate that the consumer has an account at a lender associated with the retailer. The POS may request a shopping pass. If the consumer's account has sufficient credit available, the lender may approve a purchase request and the liaison may create a shopping pass, similar to the shopping pass 200 of FIG. 2, may be created. The retailer may enter data (e.g., OCN data) from the shopping pass into the POS as if the data was from a credit card. The POS may process the shopping pass data in a manner similar to processing credit card data. In this way, a retailer can enable a consumer to access financing provided by lenders who do not offer credit cards. Thus, lender accounts corresponding to lender financing can be processed by the retailer as if they were credit card accounts, making it easy for consumer to use accounts with non-credit card lenders.

Figure 4:
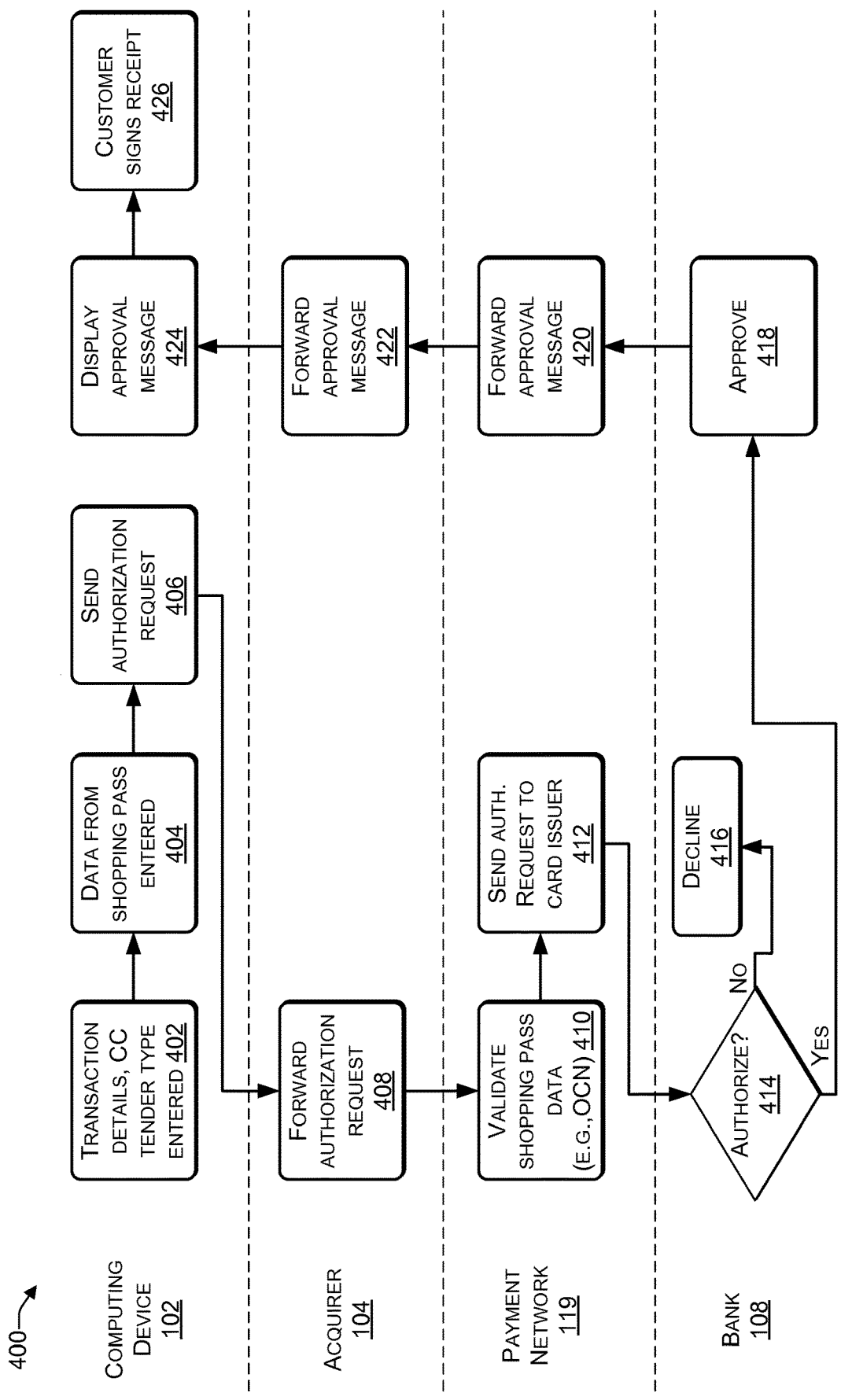
FIG. 4 is a flow diagram of processing a shopping pass according to some implementations.

FIG. 4 is a flow diagram of processing a shopping pass according to some implementations. The flow diagram 400 illustrates the interaction between the various entities of FIG. 1 when a shopping pass (e.g., the shopping pass 200 of FIG. 2) is processed.

At 402, an agent (e.g., a salesclerk) of the retailer may enter transaction details associated with the transaction into the computing device 102 of FIG. 1 and indicate that the tender type is a credit card (abbreviated "CC" in FIG. 4).

At 404, data (e.g., one or more of the OCN, an expiry date, and a security code) from the shopping pass may be entered into the computing device 102.

At 406, an authorization request that includes the transaction details and the shopping pass data may be sent to the acquirer 104. At 408, the acquirer 104 may determine that the OCN is associated with a particular payment network (e.g., Mastercard® network) and forward the authorization request to the payment network 119.

Figure 5:
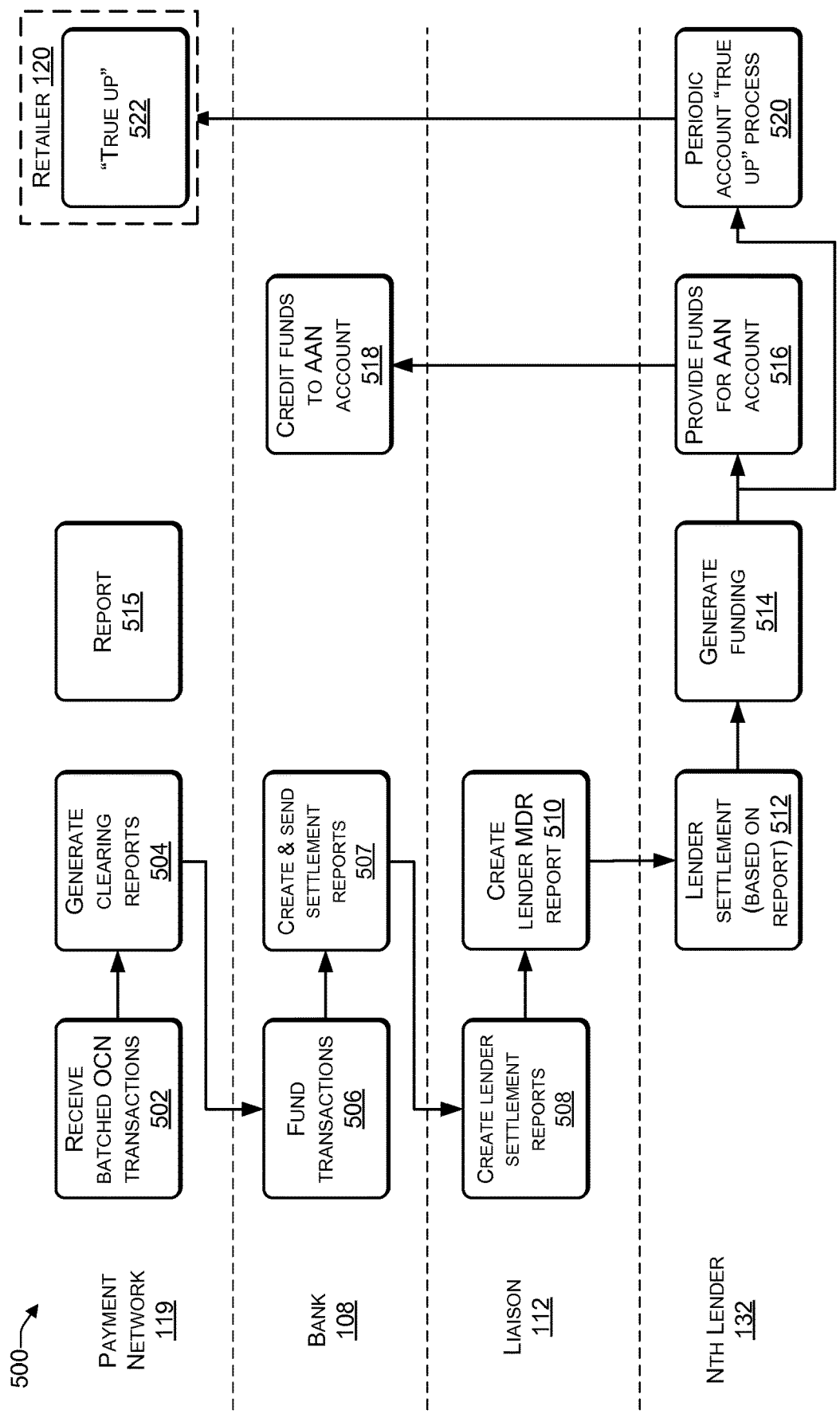
FIG. 5 is a flow diagram to settle a transaction according to some implementations.

At 410, the payment network 119 may validate the shopping pass data (e.g., the OCN). If, at 410, the payment network 119 determines that the shopping pass data is valid, then the payment network 119 may, at 412, send the authorization request to a card issuer (e.g., the bank 108). For example, the OCN may be based on an actual account number (e.g., one of the AANs 138 to 140) of the bank 108. Therefore, the authorization request may be sent to the bank 108 (or to the bank processor 124 that is associated with the bank 108). In FIGS. 3, 4, and 5, in some implementations, one or more actions described as being performed by the bank 108 may be performed by the bank processor 124 acting on behalf of (e.g., as an agent of) the bank 108.

At 414, the bank 108 (or the bank processor 124) may determine whether to authorize the transaction. For example, the bank 108 may, at 416, decline the transaction. For example, the bank 108 may decline the transaction if the AAN (e.g., upon which the OCN is based) is not valid, the AAN has reached or passed a corresponding credit limit, or other condition has been satisfied. The bank 108 may, at 418, approve the transaction. For example, the bank 108 may approve the transaction if the AAN (e.g., upon which the OCN is based) is valid, the AAN has not reached the corresponding credit limit, another condition has been satisfied, or any combination thereof.

At 418, the bank 108 may send the approval message to the computing device 102. In some cases, at 418, the bank 108 may send the approval message via the payment network 119 and, in some cases, through the acquirer 104, back to the computing device 102.

At 424, the computing device 102 may display the approval message sent by the bank 108. At 426, the consumer may sign a receipt associated with the transaction.

Thus, when processing a shopping pass, an agent of the retailer may enter the shopping pass data and indicate to the computing device 102 (e.g., POS) that the tender type is that of a credit card, thereby instructing the computing device 102 to process the shopping pass data in a manner similar to credit card data. The shopping pass data and transaction details may be sent to the issuing bank and the issuing bank may determine whether to approve or decline the transaction.

FIG. 5 is a flow diagram 500 to settle a transaction according to some implementations. The flow diagram 500 illustrates the interaction between the various entities of FIG. 1 when a transaction is settled.

At 502, the payment network 119 may receive a batched set of card transactions from each retailer via the acquirer 104. At 504, the payment network 119 may generate clearing reports and send the clearing reports to the bank 108 (or to the bank processor 124). At 506, the bank 108 may fund the transactions. At 507, the bank 108 may create and send settlement reports reports to the liaison 112.

At 508, the liaison 112 may receive the settlement reports and create lender specific settlement reports. At 510, the liaison 112 may create a lender MDR report for each lender (e.g., of the lenders 110) and send the lender specific settlement report and lender MDR report to each lender, such as the representative Nth lender 132.

At 512, the Nth lender 132 may initiate settlement based on the clearing file and the lender report that was received from the liaison 112. At 514, the Nth lender 132 may generate funding reports and at 515, send a report (e.g., a merchant discount rate (MDR) report) to each retailer. The MDR is the rate charged to a merchant (e.g., retailer) by a bank for providing debit and credit card services. The MDR is determined based on factors such as volume, average ticket price, risk, and industry. The merchant typically asks a bank to provide these services and agrees to the rate prior to accepting debit and credit cards as payment. The MDR comprises a number of dues, fees, assessments, network charges and mark-ups merchants are required to pay for accepting credit and debit cards, the largest of which is typically the interchange fee.

At 516, each lender, such as the Nth lender 132, may generate funding by providing funds for the AAN to the bank 108 (or the bank processor 124). At 518, the bank 108 may credit the funds provided by the Nth lender 132 to the AAN associated with the Nth lender 132. In this way, each lender may provide funds for the lender's corresponding AAN at the bank.

At 520, a periodic "true up" process may be run to resolve any discrepancies. For example, the "true up" process may occur periodically, e.g., every day, every week, every month, or at another interval. The "true up" may reconcile discrepancies in transactions due to returns, cancellations, etc.

Thus, the credit card partner may generate reports based on batched OCN transactions. Each lender may receive a corresponding report and settle the transactions in the report by providing funds for the AAN at the bank that is associated with the lender. For example, in FIG. 1, the first lender 130 may provide funds for the first account 134 and the Nth lender 132 may provide funds for the Nth account 136.

Figure 6:
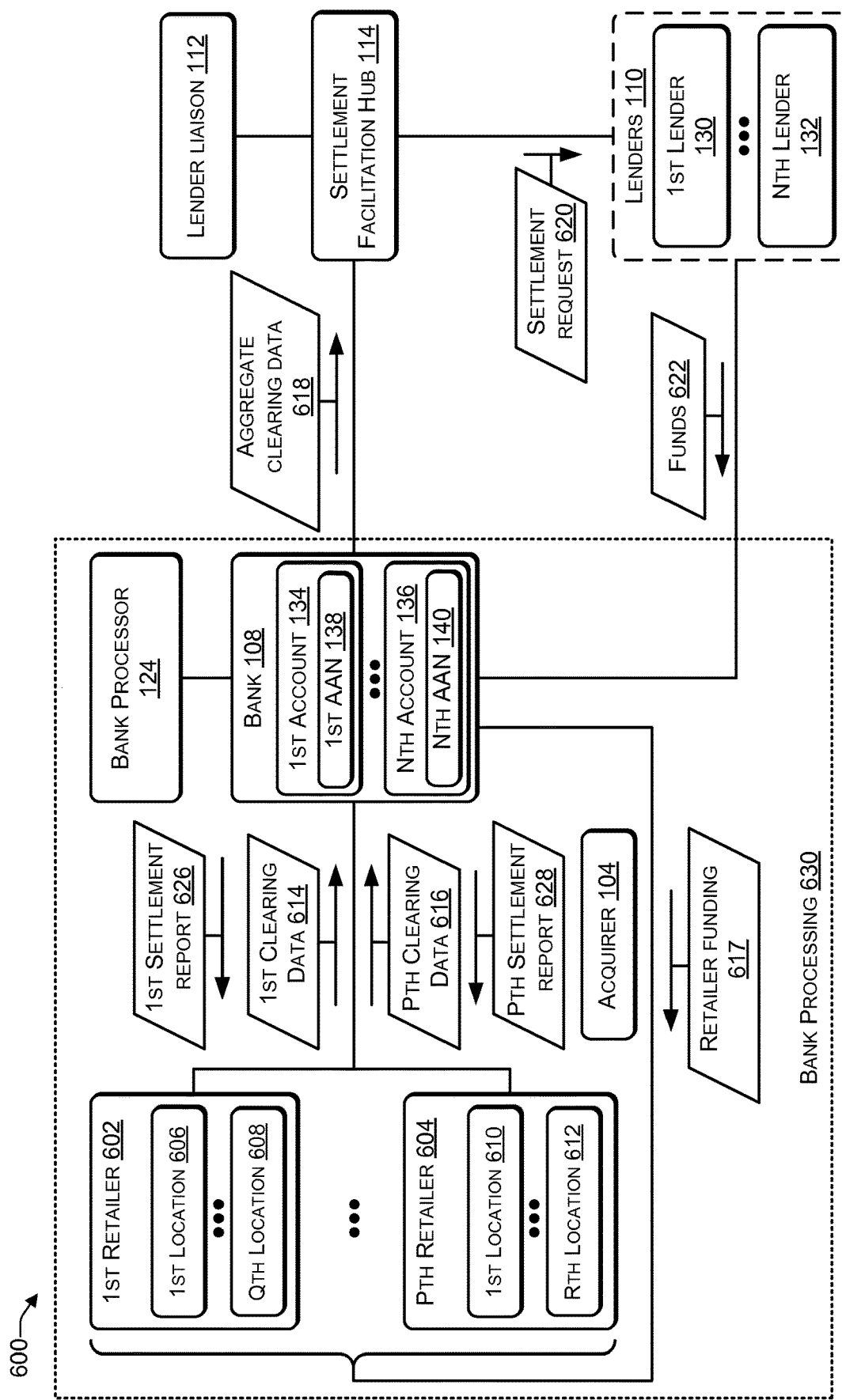
FIG. 6 is an illustrative architecture for settling one or more transactions according to some implementations.

FIG. 6 is an illustrative architecture 600 for settling one or more transactions according to some implementations. The architecture 600 illustrates how transactions may be settled. Though the network 118 of FIG. 1 is not illustrated in FIG. 6, it is to be understood that the various messages sent between entities are sent using the network 118.

Multiple retailers, including a first retailer 602 to a Pth retailer 604 (where P>1) may be involved in the settlement process. Each of the retailers 602 to 604 may have one or more locations. For example, the first retailer 602 may have a first location 606 to a Qth location 608 (where Q>1) and the Pth retailer 604 may have a first location 610 to an Rth location 612 (where R>1).

Each retailer may aggregate, via a merchant acquirer, OCN transactions across multiple locations. The merchant acquirer may send aggregate clearing data to the bank processor 124 for settlement. For example, the acquirer 104 may aggregate OCN transactions associated with the locations 606 to 608 of the first retailer 602 and send first clearing data 614 to the bank 108 (or to the bank processor 124). The acquirer 104 may aggregate OCN transactions associated with the locations 610 to 612 for the Pth retailer 604 and send Pth clearing data 616 to the bank 108 or the bank processor 124.

The bank 108 (or the bank processor 124) may aggregate the clearing data 614 to 616 to create aggregate clearing data 618. The bank 108 (or the bank processor 124) may send the aggregate clearing data 618 to the settlement facilitation hub (SFH) 114. The SFH 114 may create a settlement request 620 based on the aggregate clearing data 618 and send the settlement request 620 to one or more of the lenders 110. For example, the SFH 114 may send a first settlement request to the first lender 130 and an Nth settlement request to the Nth lender 132.

In response to receiving the settlement request 620, one or more of the lenders 110 may send funds 622 to the bank 108 (or bank processor 124). For example, the first lender 130 may send at least a portion of the funds 622 to the bank 108 (or bank processor 124) to settle the first account 134. The Nth lender 132 may send at least a portion of the funds 622 to the bank 108 (or bank processor 124) to settle the Nth account 136. The bank 108 (or bank processor 124) may provide the funds 622 to the corresponding accounts 134 to 136 at the bank 108.

The bank 108 (or the bank processor 124) may create and send settlement reports to the bank acquirer 104 based on the settlement reports 624. For example, the bank 108 (or the bank processor 124) may send a first settlement report 626 to the acquirer 104 based on the settlement results 624. The bank 108 (or the bank processor 124) may send a Pth settlement report 628 to the acquirer 104 based on the settlement results 624. The acquirer 104 may then create reports for each of the retailers 602 to 604.

In FIG. 6, bank processing 628 identifies how the retailers 602 to 604 process conventional credit cards and debit cards while the area outside bank processing 628 indicates how shopping passes (e.g., OCN data) are processed during settlement and clearing.

Thus, each retailer send clearing data to a bank (or a bank processor) via an acquirer. The bank may send aggregate clearing data to a settlement facilitation hub that sends settlement requests to one or more lenders. In response to receiving a settlement request, a lender may initiate a transfer of funds to an account at a bank. For each settlement request, the lender may provide settlement results indicating whether settlement (e.g., a transfer of funds) was successful and, if an error occurred, the lender may identify the type of error that occurred. The settlement facilitation hub may send settlement results to the bank. The bank may send settlement information to the acquirer and the acquirer may create settlement reports for each retailer based on the settlement results.

Figure 7:
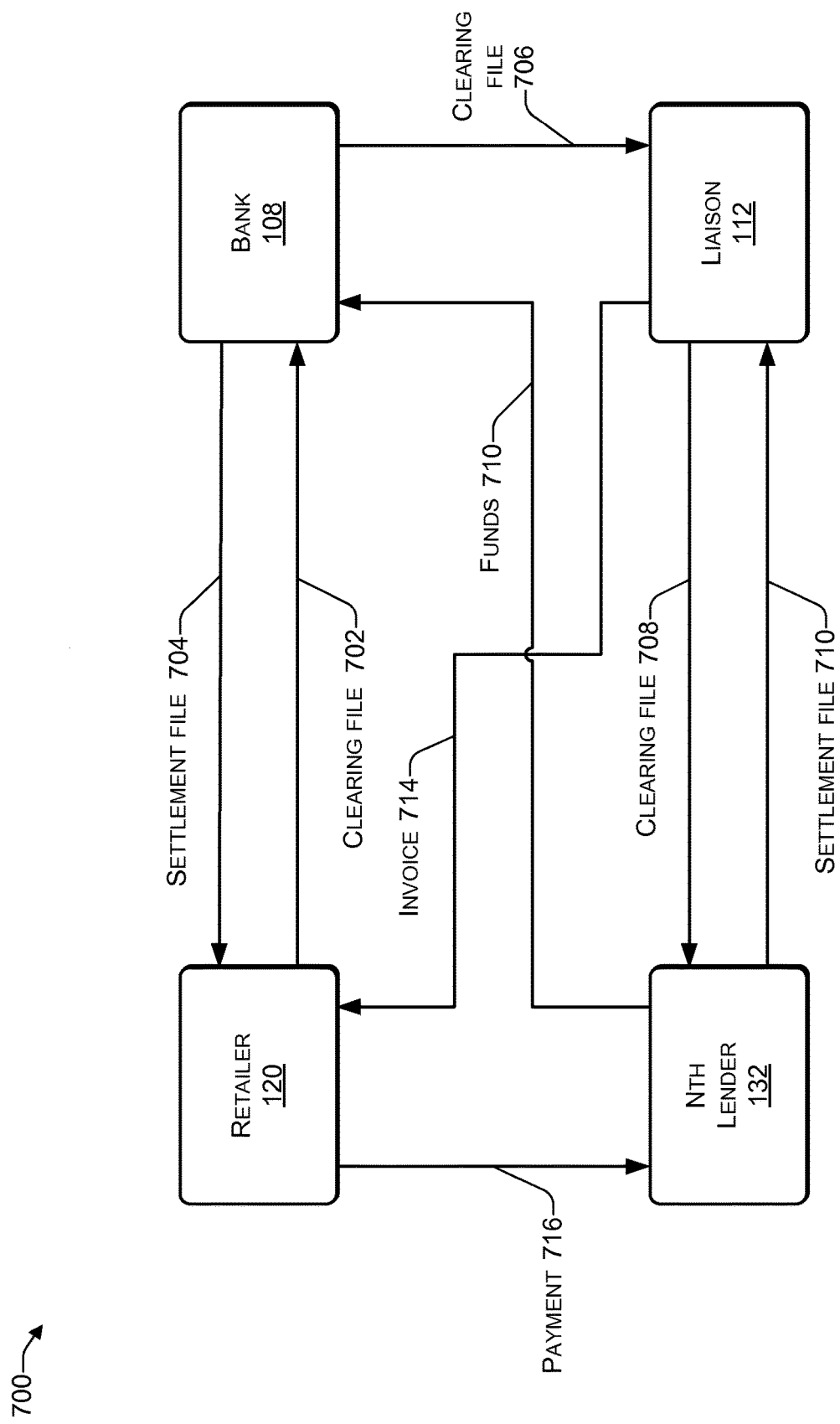
FIG. 7 is a flow diagram of an example process that includes settling one or more transactions according to some implementations.

FIG. 7 is a flow diagram of an example process 700 that includes settling one or more transactions according to some implementations. The process 700 may be performed by each retailer for each lender with which the retailer does business.

At 702, the retailer 120 may send a clearing file to the bank 108. At 704, the bank 108 may send a settlement file to the retailer 118. At 706, the bank 108 may send a clearing file to the liaison 112.

At 708, the liaison 112 may send a clearing file to a lender (e.g., the Nth lender 132). At 710, the lender may send a settlement file to the liaison 112. At 714, the liaison 112 may send an invoice to the retailer 120.

At 716, the retailer 120 may provide payment to the lender (e.g., the Nth lender 132) in response to receiving the invoice 714.

One or more of the bank 108, the liaison 112, or the lender (e.g. the Nth lender 132) may take a portion of the transaction total as a fee for facilitating the transaction. The fee may be a fixed fee (e.g., $5), a percentage of the transaction total (e.g., 5%), a percentage up to a cap (e.g., 5% or $50 whichever is greater or whichever is less), a fixed fee plus a percentage (e.g., $5 up to X and 5% of anything above X), a sliding scale (e.g., 10% of a first range, 5% of a second range, 3% of a third range, etc.), another type of fee arrangement, or any combination thereof.

Example Processes

In the flow diagrams of FIGS. 8, 9, 10, and 11 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800, 900, 1000, and 1100 are described with reference to FIGS. 1, 2, 3, 4, 5, 6, and 7 as described above, although other models, frameworks, systems and environments may be used to implement these processes.

Figure 8:
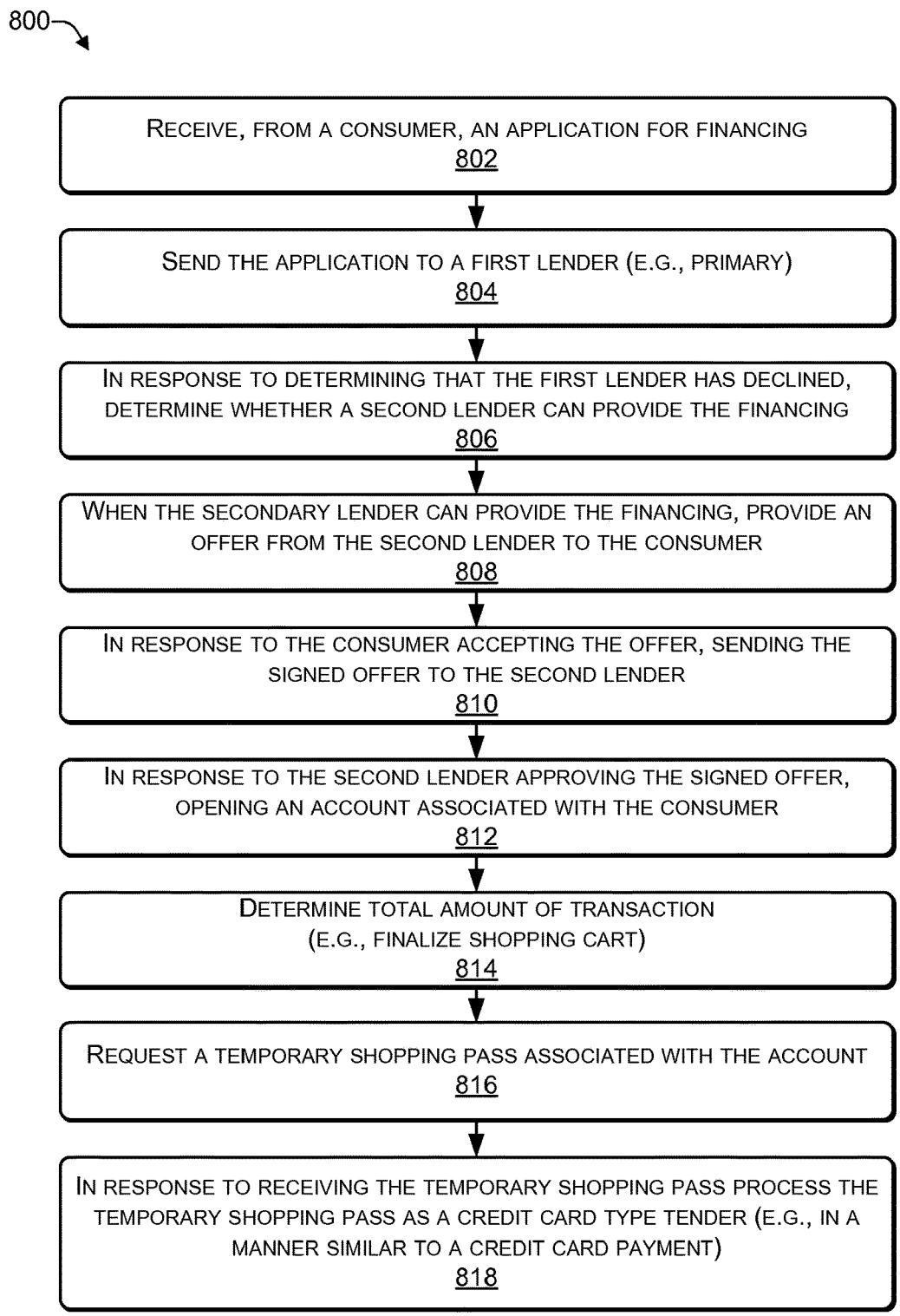
FIG. 8 is a flow diagram of an example process that includes requesting a shopping pass according to some implementations.

FIG. 8 is a flow diagram of an example process 800 that includes requesting a shopping pass according to some implementations. The process 800 may be performed by one or more of the entities described in FIG. 1.

At 802, an application for financing may be received from a consumer. For example, in FIG. 1, the retailer 120 may receive the application 144 from the consumer 142. The consumer 142 may apply for financing in order to complete a transaction to acquire one or more items from the retailer 120.

At 804, the application may be sent to a first lender, such as a primary lender associated with a retailer. For example, in FIG. 1, the computing device 102 may send the application 144 to one or more of the lenders 110.

At 806, in response to determining that the first lender has declined to approve the application, a determination may be made whether a second lender can provide financing. For example, in FIG. 1, the liaison 112 may compare criteria provided by the lenders 110 to the application 144. The liaison 112 may determine a weighted score for two or more of the lenders 110 based on weighing the criteria and then select a lender offer for financing based on one or more criteria specified by the retailer 120. For example, if the consumer 142 qualifies for more than one offer from more than one of the lenders 130 to 132, the liaison 112 may select an offer that provides a highest credit limit to the consumer 142.

At 808, when the secondary lender is capable of providing financing, the second lender may provide an offer of financing to the consumer 142. The selected offer may be sent by one of the lenders 110 to the retailer 120. The offer, including the terms and conditions of the offer, may be presented to the consumer 142 at a location of the retailer 120. For example, the computing device 102 may display or print the offer to present the offer to the consumer 142.

At 810, after the offer is presented to the consumer (e.g., at a location of the retailer), if the consumer accepts the offer, the signed offer may be sent to the second lender. For example, in FIG. 1, if the consumer 142 accepts an offer for financing from one of the lenders 110, the signed offer may be returned to the lender providing the offer.

At 812, if the second lender approves the signed offer, the second lender may create an account and associate the account with the consumer. In response to receiving the signed offer, the second lender may create an account and associate the account with the consumer.

At 814, when the consumer initiates a transaction to acquire one or more items from the retailer, a total amount of the transaction may be determined and the transaction may be saved, suspended, or both. For example, in FIG. 1, when the consumer 142 initiates a transaction with the retailer 120, the consumer 142 may indicate that the consumer 142 desires to finance the transaction using the financing provided by the lender. In response, the retailer 120 may save the transaction data using the computing device 102 and suspend the transaction in order to obtain a temporary shopping pass (e.g., the shopping pass 200 of FIG. 2), as described in FIG. 3.

At 816, a request for a temporary shopping associated with the consumer's account may be sent. The computing device 102 may send a request for a temporary shopping pass based on the consumer's account with the lender, as described in FIG. 3.

At 818, in response to receiving the temporary shopping pass, the retailer may resume and complete the transaction by processing the temporary shopping pass as a credit card type of tender (e.g., in a manner similar to a credit card transaction). In response to receiving the temporary shopping pass that includes a OCN, the retailer 120 may process the temporary shopping pass as a credit card type of tender to complete the transaction, as described in FIG. 3 and FIG. 4. The POS terminal may process the temporary shopping pass as though the temporary shopping pass was a credit card.

Figure 9:
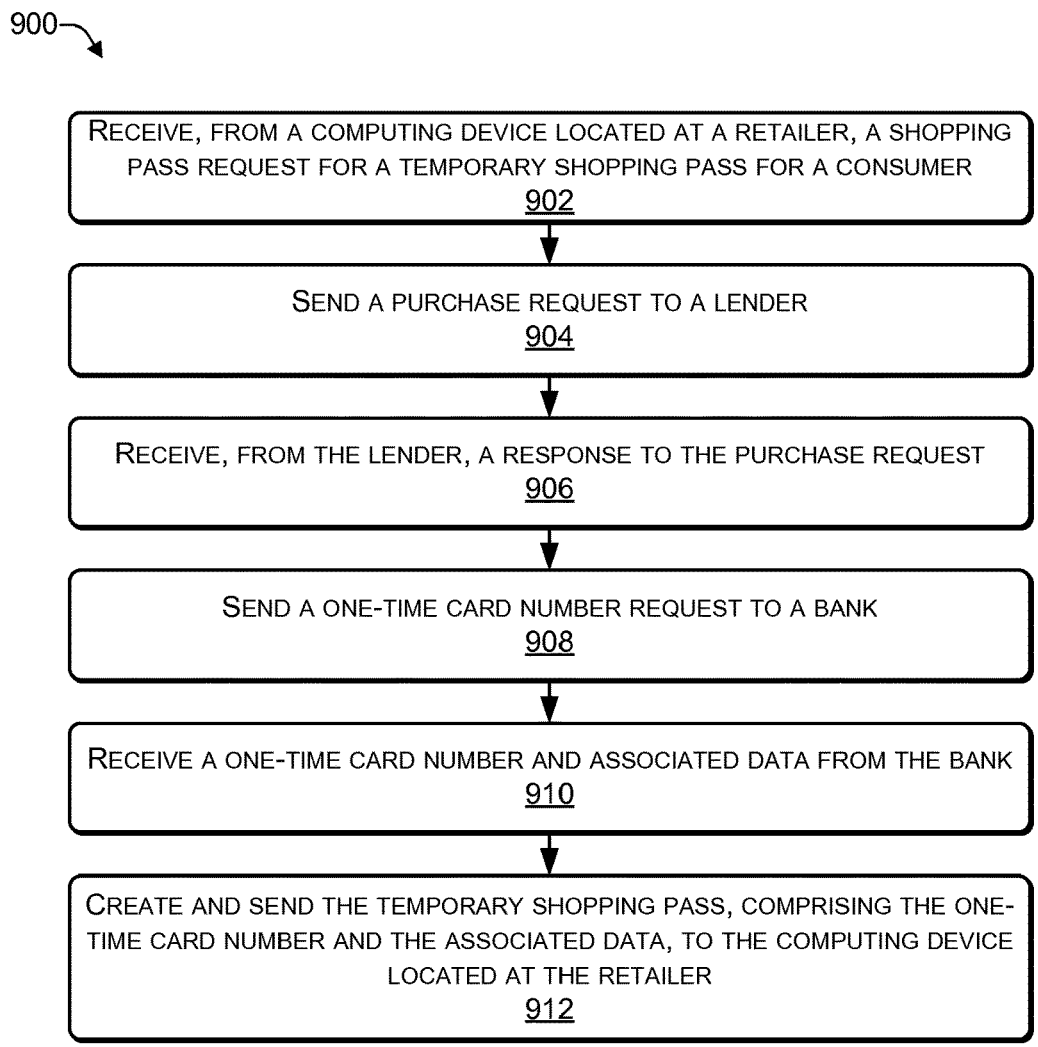
FIG. 9 is a flow diagram of an example process that includes receiving a one-time card number according to some implementations.

FIG. 9 is a flow diagram of an example process 900 that includes receiving a one-time card number according to some implementations. The process 900 may be performed by the liaison 112 of FIG. 1.

At 902, a request for a temporary shopping pass for a consumer may be received from a computing device located at a retailer. For example, in FIG. 3, at 310, the computing device 102 may send a request for a shopping pass to the liaison 112.

At 904, a purchase request may be sent to a lender (e.g., where the consumer has an account). For example, in FIG. 3, at 312, the liaison 112 may forward the purchase request to a lender (e.g., the Nth lender 132, where N>0) where the consumer has an account.

At 906, a response (e.g., approving or declining the purchase request) may be received from the lender. The response may include an amount of a credit limit available to the consumer.

At 908, a request for an OCN may be sent to a bank. For example, in FIG. 3, at 322, a request to create a OCN may be sent to the bank 108. In some cases, the request to create the OCN may be sent to the bank processor 124 and the bank processor 124 may forward the request to create the OCN to the bank 108.

At 910, an OCN and associated data (e.g., expiry date, security code, etc.) may be received from the bank processor 124. For example, in FIG. 3, at 326, the liaison 112 may receive OCN data from the bank 108. In some cases, the OCN may be sent to the bank processor 124 and the bank processor 124 may forward the OCN to the liaison 112.

At 912, a temporary shopping pass, including the OCN and the associated data, may be created and sent to the computing device 102 located at the retailer 120. For example, in FIG. 3, at 326, the liaison 112 may create a shopping pass based on the OCN data (e.g., OCN, expiry date, and security code) and send the shopping pass to the computing device 102.

Thus, the liaison 112 may receive the request to create a shopping pass, receive approval for the transaction amount from the lender, request and receive a OCN from a bank that hosts the lender's AAN, create a temporary shopping pass based on the OCN, and send the temporary shopping pass to a computing device of the retailer to enable the retailer to complete the transaction. The retailer may process the temporary shopping pass as a credit card tender type using the retailer's POS.

Figure 10:
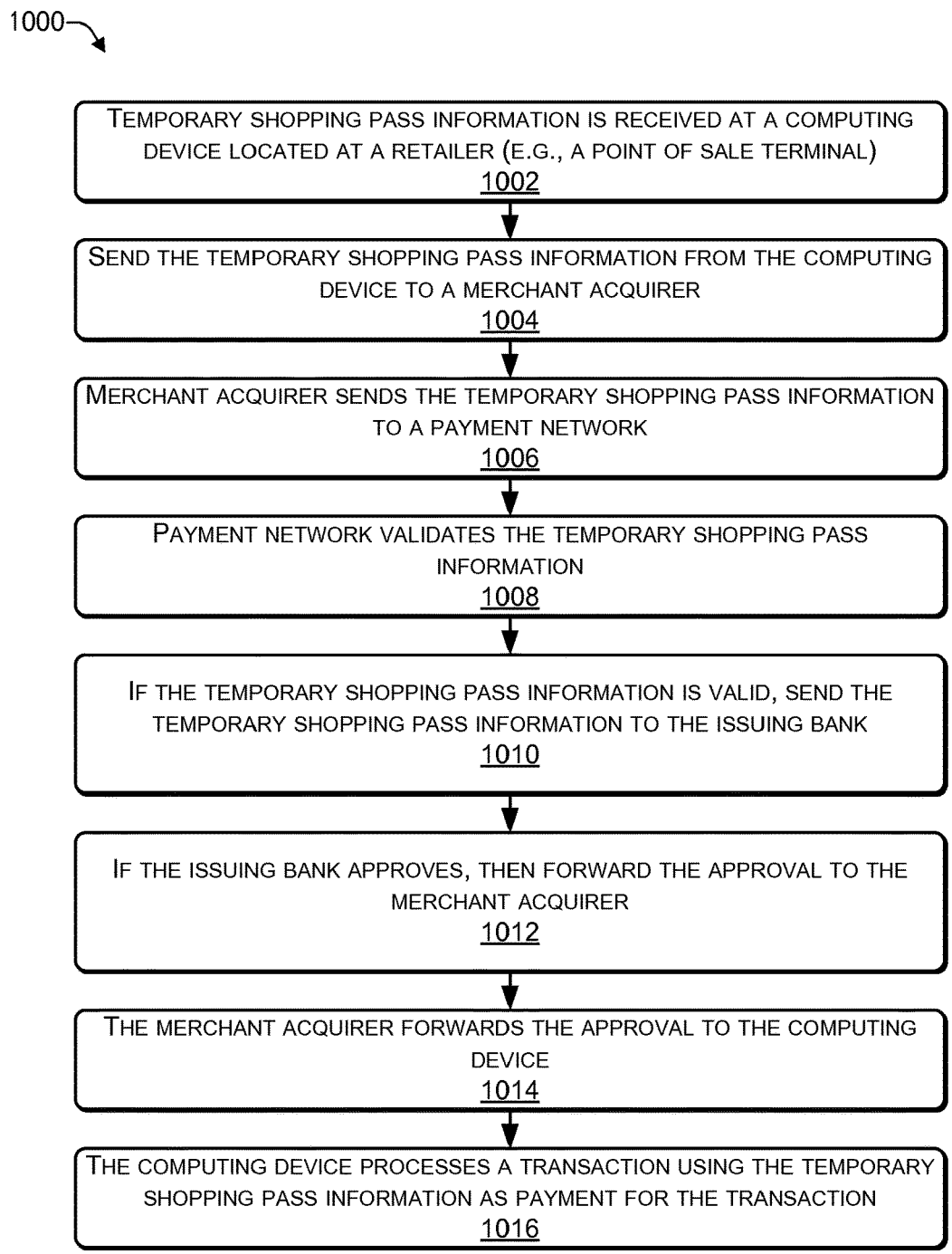
FIG. 10 is a flow diagram of an example process that includes receiving information associated with a temporary shopping pass according to some implementations.

FIG. 10 is a flow diagram of an example process 1000 that includes receiving information associated with a temporary shopping pass according to some implementations. The process 1000 may be performed by one or more of the entities described in FIG. 1. The process 1000 describes how a temporary shopping pass may be processed in a manner similar to a credit card, thereby enabling a lender to provide financing that the retailer processes like a credit card.

At 1002, temporary shopping pass information may be received at a computing device (e.g., POS) located at a retailer. For example, in FIG. 4, at 402 and 404, the transaction details and the data from the shopping pass may be entered into the computing device 102 with a credit card tender type selected.

At 1004, the temporary shopping pass information may be sent to a merchant acquirer associated with the retailer. For example, in FIG. 1, the transaction data 146 and the one-time account data 150 may be sent to the acquirer 104.

At 1006, the merchant acquirer may send the temporary shopping pass information to a payment network.

At 1008, the payment network may validate the temporary shopping pass information.

At 1010, if the temporary shopping pass information is valid, the temporary shopping pass information may be sent from the bank processor to an issuing bank (e.g., the bank that provided the OCN used to create the temporary shopping pass). For example, in FIG. 1, the bank processor 124 may send the one-time account data 150 to the issuing bank, e.g., the bank 108. The bank 108 may determine whether the AAN (e.g., one of the AANs 138 to 140) associated with the one-time account data 150 has sufficient funds based on the transaction data 146. If the associated AAN has sufficient funds, the issuing bank 108 may approve using the temporary shopping pass to fund the transaction.

At 1012, if the issuing bank approves, the bank processor may forward the approval to the merchant acquirer. At 1014, the merchant acquirer may forward the approval to the computing device (e.g., POS).

At 1016, the computing device may process the transaction using the temporary shopping pass information as payment for the transaction. For example, in FIG. 1, the computing device 102 may, in response to receiving approval, complete the transaction with a credit card tender type using the shopping pass data.

FIG. 11 is a flow diagram of an example process 1100 that includes processing a return for a purchase made using a temporary shopping pass according to some implementations. The process 1100 may be performed by one or more of the entities described in FIG. 1.

At 1102, the consumer may present an original purchase receipt and one or more items (e.g., merchandise) to be returned to an agent (e.g., sales associate) of a retailer. At 1104, the receipt and one or more identifiers associated with the one or more items may be entered into a computing device, such as a point of sale (POS) terminal, of the retailer. In FIG. 11, the computing device 102 is referred to as a POS terminal purely for ease of discussion. As used herein, the term "POS terminal" may refer to any computing device used by the retailer to process transactions, returns, etc. At 1106, a one-time card number and an amount to be returned may be determined by the POS terminal. At 1108, a return request may be sent from the POS terminal to a merchant acquirer. For example, in FIG. 1, the consumer 142 may present a receipt and one or more items to be returned to a salesclerk of the retailer 120. The salesclerk may enter into the computing device 102 information associated with the transaction by entering information from the original purchase receipt and entering an identity of each item that is to be returned. In some cases, to enter the information associated with the transaction, the salesclerk may scan a code of the original purchase receipt, a code associated with each item to be returned, or both. The computing device 102 may determine an amount to be returned to the consumer 142 as part of the return and send a return request to the acquirer 104.

At 1110, the merchant acquirer may pass the return request to a bank processor. At 1112, if the bank processor determines that the OCN is valid, the bank processor may authorize reversal of a charge. At 1114, the bank processor may send a reversal message to the merchant acquirer. At 1116, the merchant acquirer may forward the reversal message to the POS terminal. For example, in FIG. 1, the acquirer 104 may send the return request to the bank processor 124 and the bank processor 124 may determine whether the OCN associated with the transaction is valid. If the bank processor 124 determines that the OCN associated with the transaction is valid, the bank processor 124 may send to the acquirer 104 a reversal message indicating that the reversal request was approved. The acquirer 104 may send the reversal message to the computing device 102.

At 1118, the POS terminal may process the reversal in response to receiving the reversal message. A consumer credit may be issued through the merchant's clearing and settlement process. For example, in FIG. 1, in response to receiving the reversal message, the computing device 102 may complete processing the return and issue a credit to the consumer 142. The return may be processed through the merchant's clearing and settlement process, as described in FIGS. 5 and 6.

In some cases, at 1120, the POS terminal may process an additional transaction. For example, the consumer may return one or more items and then acquire one or more additional items. To illustrate, in FIG. 1, the consumer 142 may return an item that did not fit or that the consumer 142 did not find aesthetically pleasing and purchase another item having a different size or a different aesthetic value. Thus, a temporary shopping pass may be used to purchase, return a set of items, and purchase another set of items.

Example Computing Device and Environment

FIG. 12 illustrates an example configuration of a computing device 1200 and environment that can be used to implement the functions described herein. For example, the computing device 102, the liaison 112, the SFH 114, and the lenders 108 to 110 may each include an architecture that is similar to or based on the computing device 1200.

The computing device 1200 may include one or more processors 1202, one or more computer-readable media (e.g., memory) 1204, communication interfaces 1206, a display device 1208, other input/output (I/O) devices 1210, and one or more mass storage devices 1212, able to communicate with each other, such as via a system bus 1214 or other suitable device. The I/O devices 1210 may include a keyboard, a mouse, a touchscreen display, a touch-sensitive pad and stylus, a camera, a scanner, a fax machine, etc.

The processor 1202 may be a single processing unit or a number of processing units, all of which may include single or multiple computing units or multiple cores. The processor 1202 may be implemented as one or more microprocessors, microcomputers, microcontrollers, digital signal processors, central processing units, state machines, logic circuitries, and/or any devices that manipulate signals based on operational instructions. Among other capabilities, the processor 1202 may be configured to fetch and execute computer-readable instructions stored in the memory 1204, mass storage devices 1212, or other computer-readable media.

Memory 1204 and mass storage devices 1212 are examples of computer storage media for storing instructions 1216, which may be executed by the processor 1202 to perform the various functions described herein. For example, memory 1204 may generally include both volatile memory and non-volatile memory (e.g., RAM, ROM, or the like). Further, mass storage devices 1212 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1204 and mass storage devices 1212 may be collectively referred to as memory or computer storage media herein, and may be capable of storing computer-readable, processor-executable program instructions as computer program code that can be executed by the processor 1202 as a particular machine configured for carrying out the operations and functions described in the implementations herein.

Computer storage media includes non-transitory media, such as non-volatile, removable and non-removable media implemented in any method or technology for storage of information, such as computer readable instructions, data structures, program modules, or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A method performed by one or more processors executing instructions to perform acts comprising:
receiving, from a point of sale terminal of a retailer, a first data package corresponding to transaction data associated with a transaction to acquire one or more items from the retailer;
receiving the first data package including a real-time request for a temporary shopping pass from the point of sale terminal at a second computing device via a network, the temporary shopping pass corresponding to transaction data associated with a transaction to acquire one or more items from the retailer, wherein the temporary shopping pass comprises a digital payment instrument corresponding to a type of financing provided by a lender;
selecting, by the second computing device, the lender to offer the financing of the transaction based on credit offer criteria specified by the retailer, including:
receiving a plurality of credit offers from a plurality of lenders;
retrieving a retailer profile including credit offer attribute thresholds specific to the retailer;
comparing the credit offer attribute thresholds to corresponding offer attribute values of each credit offer from the plurality of lenders to determine valid offers;
weighing, by the one or more processors, one or more criteria related to the valid offers based on weighting criteria in the retailer profile;
selecting, by the one or more processors, the lender based on the weighing of a valid offer presented by the lender; and
sending, to the point of sale terminal, a second data package as a real-time credit response including the temporary shopping pass financed by the lender, the second data package including shopping pass data configured to be processed at the point of sale terminal as a credit card type tender to complete the transaction, wherein the temporary shopping pass is configured to be unusable as tender after the transaction is completed.

2. The method as recited in claim 1, wherein the temporary shopping pass corresponds to a financial instrument provided by the lender that is associated with an account of the consumer.

3. The method as recited in claim 1, wherein
the request for the temporary shopping pass is based on determining a total amount associated with the transaction; and
the transaction is temporarily suspended based on sending the request for the temporary shopping pass.

4. The method as recited in claim 1, wherein the shopping pass data comprises at least one of:
a one-time card number comprising at least twelve digits;
an expiry date comprising one or more of a day, a month, or a year;
a shopping pass identifier; and
a security code comprising at least three digits.

5. The method as recited in claim 1, wherein:
the temporary shopping pass is created by a bank processor associated with a bank; and
the temporary shopping pass includes a one-time card number that is based on an actual account number associated with an account at the bank.

6. The method as recited in claim 1, wherein the transaction data associated with the transaction to acquire the one or more items from the retailer comprises at least one of:
one or more individual amounts associated with individual items of the one or more items;
a discount amount associated with the transaction;
a sales tax amount of a sales tax associated with the transaction;
a shipping amount associated with shipping costs associated with the transaction; or
a total amount associated with the transaction.

7. The method as recited in claim 1, wherein completing the transaction by processing the shopping pass data as the credit card type tender comprises:
sending the shopping pass data to a merchant acquirer associated with the retailer, the merchant acquirer to determine a one-time card number included in the shopping pass data, identify a bank that issued the one-time card number, and forward the shopping pass data to a bank processor associated with the bank that issued the one-time card number.

8. A point of sale terminal comprising:
one or more processors;
one or more data storage media to store instructions that are executable by the one or more processors to perform acts comprising:
providing a retailer profile to a second computing device, the retailer profile including credit information specific to a retailer associated with the point of sale terminal, including:

credit offer attribute thresholds defined by the retailer;
weighting criteria for ranking credit offers;
receiving transaction data associated with a transaction to acquire one or more items from the retailer;
sending a request for a temporary shopping pass from the point of sale terminal to the second computing device, wherein
the temporary shopping pass comprises a virtual payment instrument associated with an account of a consumer at a lender, and wherein
the request comprises at least a portion of the transaction data;
receiving the temporary shopping pass, wherein
after determining that a primary lender associated with the retailer has declined to offer financing, the temporary shopping pass is received in response to automatically selecting a lender from one or more secondary lenders to offer financing of the transaction, and
selecting the lender comprises:
determining, by the second computing device, valid credit offers from a plurality of credit offers from a plurality of lenders based on comparing the credit offer attribute thresholds to corresponding offer attribute values of each credit offer, wherein the plurality of lenders comprises the primary lender and the one or more secondary lenders;
weighing, by the second computing device, one or more criteria related to the valid credit offers based on the weighting criteria; and
selecting, by the second computing device, the lender based on the weighing of a valid offer presented by the lender;
determining, from the temporary shopping pass as a credit card tender type, a one-time card number; and
completing the transaction using the temporary shopping pass.

9. The point of sale terminal as recited in claim 8, wherein, before sending the request for the temporary shopping pass, the instructions are further executable to perform acts comprising:
determining a total amount associated with the transaction; and
temporarily suspending the transaction.

10. The point of sale terminal as recited in claim 8, wherein the transaction data associated with the transaction to acquire the one or more items from the retailer comprises at least one of:
one or more individual amounts associated with individual items of the one or more items;
a discount amount associated with the transaction;
a sales tax amount of a sales tax associated with the transaction;
a shipping amount associated with shipping costs associated with the transaction; or
a total amount associated with the transaction.

11. The point of sale terminal as recited in claim 8, further comprising:
determining, from the temporary shopping pass as the credit card tender type, an expiry date and a security code associated with the one-time card number.

12. The point of sale terminal as recited in claim 8, wherein the temporary shopping pass comprises at least one of a loan, a lease, or a revolving line of credit provided by the lender to the account associated with the consumer.

13. The point of sale terminal as recited in claim 8, wherein the temporary shopping pass is not usable as tender after completing the transaction.

14. One or more non-transitory computer-readable storage media including instructions that are executable by one or more processors to perform acts comprising:
receiving transaction data, including a request for a temporary shopping pass, associated with a transaction to acquire one or more items from a retailer;
processing the request for the temporary shopping pass from a point of sale terminal of a retailer at a second computing device, the temporary shopping pass corresponding to transaction data associated with a transaction to acquire on or more items from the retailer, wherein the temporary shopping pass comprises a virtual payment instrument;
selecting a lender to finance the temporary shopping pass, by the second computing device, including:
obtaining a retailer profile including credit offer attribute thresholds specific to the retailer;
determining valid offers from a plurality of credit offers presented by a plurality of lenders based on comparing the credit offer attribute thresholds to corresponding offer attribute values of the plurality of credit offers;
weighing one or more criteria related to the valid offers based on weighting criteria in the retailer profile; and
selecting the lender based on the weighing of a valid offer presented by the lender;
sending the temporary shopping pass, including at least a one-time card number and an expiry date, from the secondary computing device to the point of sale terminal for completing the transaction using the temporary shopping pass as a credit card tender type.

15. The one of more non-transitory computer-readable storage media as recited in claim 14, wherein, the instructions are further executable to perform acts comprising:
determining a total amount associated with the transaction; and
temporarily suspending the transaction by saving the transaction data in the one or more non-transitory computer-readable storage media.

16. The one of more non-transitory computer-readable storage media as recited in claim 14, wherein the transaction data comprises at least one of:
one or more individual amounts associated with individual items of the one or more items;
a discount amount associated with the transaction;
a sales tax amount of a sales tax associated with the transaction;
a shipping amount associated with shipping costs associated with the transaction; or
a total amount associated with the transaction.

17. The one of more non-transitory computer-readable storage media as recited in claim 14, wherein the temporary shopping pass is not usable as tender after completing the transaction.

18. The one of more non-transitory computer-readable storage media as recited in claim 14, wherein:
selecting the lender, by the second computing device, further comprises:
assigning an attribute score to each of a plurality of attribute values of a credit offer based on table driven score bands;
applying the weighting criteria to the attribute scores to obtain weighted attribute scores;

determining an offer score for the credit offer based on a sum total of the weighted attribute scores; and selecting the lender based on a highest offer score.

19. The one of more non-transitory computer-readable storage media as recited in claim 14, wherein completing the transaction using the shopping pass data comprises:

sending the one-time card number and the expiry date to a merchant acquirer associated with the retailer, the merchant acquirer to forward the shopping pass data to a bank processor associated with a bank that issued the one-time card number.

20. The one of more non-transitory computer-readable storage media as recited in claim 14, wherein:

the temporary shopping pass is created by a bank processor associated with a bank;

the one-time card number is based on an actual account number associated with an account at the bank;

a lender liaison performs acts comprising:

receiving the request for the temporary shopping pass;

determining whether the lender pre-authorizes the transaction;

in response to determining that the lender has pre-authorized the transaction, sending a request to a bank for the one-time card number;

in response to receiving the one-time card number from the bank, creating the temporary shopping pass; and sending the temporary shopping pass to a point of sale terminal associated with the retailer.

* * * * *